United States Patent [19]

Blount

[11] 4,072,637
[45] Feb. 7, 1978

[54] PROCESS FOR THE PRODUCTION OF POLYURETHANE RESINS AND FOAMS UTILIZING SILICO-FORMIC ACID

[76] Inventor: David H. Blount, 5450 Lea St., San Diego, Calif. 92105

[21] Appl. No.: 599,000

[22] Filed: July 25, 1975

Related U.S. Application Data

[63] Continuation-in-part of Ser. No. 262,485, June 14, 1972, abandoned, which is a continuation-in-part of Ser. No. 71,628, Sept. 11, 1970, abandoned.

[51] Int. Cl.$^2$ ............................................. C08G 18/38
[52] U.S. Cl. .......................... 260/2.5 AM; 260/2.5 A; 260/2.5 AK
[58] Field of Search ...... 260/2.5 A, 2.5 AM, 2.5 AK, 260/2.5 AT

[56] References Cited

U.S. PATENT DOCUMENTS

| | | | |
|---|---|---|---|
| 3,004,921 | 10/1961 | Stossel | 260/2.5 AK |
| 3,674,430 | 6/1970 | Illigen | 423/325 |
| 3,956,466 | 5/1976 | Blount | 423/325 |

FOREIGN PATENT DOCUMENTS

| | | | |
|---|---|---|---|
| 2,325,090 | 11/1974 | Germany | 260/2.5 A |

Primary Examiner—C. Warren Ivy

[57] ABSTRACT

Silico-formic acid is reacted with a suitable isocyanate to produce an isocyanate-silico-formate resins of the type generally referred to as a polyurethane resin. An activator, such as water, may be mixed with the resin to cause foaming and/or cross linking of the polymer.

11 Claims, No Drawings

PROCESS FOR THE PRODUCTION OF POLYURETHANE RESINS AND FOAMS UTILIZING SILICO-FORMIC ACID

CROSS-REFERENCE TO RELATED APPLICATIONS

This application is a continuation-in-part of my co-pending U.S. patent application, Ser. No. 262,485, filed June 14, 1972, which is a continuation-in-part of my earlier U.S. patent application, Ser. No. 71,628, filed Sept. 11, 1970, both now abandoned.

BACKGROUND OF THE INVENTION

This invention relates in general to a process for producing novel polyurethane-type resins and foams, and, more specifically, to a method of producing resins by reacting silico-formic acid with a suitable isocyanate (generally a diisocyanate) to produce an isocyanate-silico-formate resin.

As is well known, polyurethane resins and foams have a number of applications, including use in coatings and adhesives, as soft foam padding, reinforcement for thin metal structures, rigid foam packaging, etc. The resins and foams of this invention give excellent results in a number of these applications. These resins may also be used as impregnants, molding powders, and as an ingredient in dispersions, prepolymers, paints and varnishes.

It is an object of this invention to provide a process for producing isocyanate-silico-formate polymers.

Another object is to provide a process for producing isocyanate-silico-formate polymer foams.

Yet another object of this invention is to produce novel isocyanate-silico-formate compounds and foams.

A further object is to provide modified isocyanate-silico-formate polymers and foams which are soluable in selected organic solvents.

SUMMARY OF THE INVENTION

I have discovered that resins having novel properties may be prepared by reacting (preferrably in an approximately stoichiometric ratio) silico-formic acid with a suitable isocyanate. This reaction is endothermic, in contrast to the chemical reaction of most isocyanates with most alcohols, which are generally exothermic. While the reactants may be maintained at any suitable temperature, best results have generally been obtained with temperatures in the range of about 20° to 60° C.

The resins of this invention may be foamed and/or cross linked by the addition of suitable catalysts, emulsifiers, modifiers and dispersing agents. Many of the "foaming agents" or "blowing agents" act simply as catalysts, while others act both as catalysts and enter into the reaction which produces foaming. For the purpose on this invention, these various agents will be generally referred to as "foaming agents". In addition to the preferred process, described above, of reacting silico-formic acid and a suitable diisocyanate, followed by the addition of a suitable foaming agent, several alternative related reactions are contemplated. For example, after reaction of the silico-formic acid with a diisocyanate, a suitable polyhydoxy compound may be added to react with silico-formic acid which had been added in excess, so that a foam with varied properties may be produced upon addition of a suitable foaming agent. Also, copolymers comprising silico-formic acid, diisocyanate and polyhydroxy compounds may be prepared by co-reacting the three ingredients, or by reacting two of them and adding the third. While it is clear that these variations on the basic process give products with varying properties, the mechanics of these reactions are not fully understood. While the foaming reaction may take place at any suitable temperature, generally best results are obtained when the composition is foamed at a temperature of from about 90° to 150° C.

DETAILED DESCRIPTION OF THE INVENTION

The silico-formic acid used in this process may be produced by any suitable method. Typically, a dry alkaline earth metasilicate or a dry alkali metal metasilicate may be reacted with a mineral acid or a hydrogen salt. Also, silico-formic acid (also sometimes known as monosilanic acid) may be produced by other methods such as those described in U.S. Pat. No. 3,674,430.

Any suitable isocyanate may be used in the process of this invention. Typical isocyanates include toluene-2,4-diisocyanate; toluene-2,6-diisocyanate; diphenylmethane-2,4-diisocyanate; 3, 3'-dimethyldiphenylmethane-4,4'-diisocyanate; meta-phenylene diisocyanate; triphenylmethane triisocyanate; hexamethylene diisocyanate; dianisidine diisocyanate; xenylene diisocyanate; dichloroxenylene diisocyanate; naphthalene-1,5-diisocyanate; diphenyl sulfone-1,4-diisocyanate; 2-nitrodiphenyl-4,4'-diisocyanate; fluorene diisocyanate; and mixtures thereof. Best results are generally obtained with toluene-2,4-diisocyanate, toluene-2,6-diisocyanate, and mixtures thereof. These, therefore, are the preferred diisocyanates for use in the process of this invention.

Any suitable foaming agent and/or catalyst may be used to foam these resins. Typical additives include water; cobalt napthenate; N-methylmorphatine; dimethyl ethanolamine; triethylamine; N,N'-diethylcyclohexylamine; N,N-dimethylcyclo hexylamine; acetic acid; organic tin compounds; and mixtures thereof. Water, together with an amine or tin compound catalyst has been found to be expecially effective and is, therefore, preferred. The water reacts with the main isocyanate groups, to cause cross-linking with the evolution of carbon dioxide, which causes foaming.

If desired, suitable amounts of other additives may be added to modify the foam density, air cell size, etc. Typical additives include alkalated phenoxy; polyethoxy; ethanol; ammonium oleate; sulphenated castor oil; manganous chloride; zinc stearate; parafin oil; calcium stearate; dioctyl sulfosuccinate; and mixtures thereof. Other modifiers may be added to modify the characteristics of the resins and foams, if desired. Typical modifiers include polyalcohols such as caster oil, vegetable oils, polyester resins, polyether resins, monoglycerides of hard fatty acids, glycol, ethylene glycol, diethylene glycol, triethylene glycol, butylene glycol, trimethylene glycol, tetramethylene glycol, glycerol monochlorohydrin, polybutylene glycol, polystyrene glycol, di and tripentaerythritol, trimethylol ethane, trimethylol propane, sorbitol, mannitol, soya bean oil, linseed oil, cottonseed oil, dehydrated castor oil, tung oil, fish oil, perilla oil, oiticia oil, sunflower oil, safflower oil, walnut oil, and mixtures or other combinations thereof. Polyalcohols of the sort listed above may also be chemically reacted with silico-formic acid to form compounds which may be used to modify the resins of this invention.

While all of the details of the reactions which take place are not fully understood, it appears that the acid generally reacts with one isocyanate group, leaving the other isocyanate group active to participate in a polymerization and/or cross-linking reaction, concurrent with generation of a foam-producing gas. While these reactions are believed to be typical of those which occur during the process of this invention, these processes are not limited by this theoretical reaction.

For the purposes of this invention, the products resulting from the reaction of silico-formic acid and diisocyanates and subsequent polymerization, cross linking and foaming will be generally identified as "isocyanate-silico-formate" compounds, resins and foams.

DESCRIPTION OF PREFERRED EMBODIMENTS

My invention will be illustrated in greater detail in the specific examples which follow, it being understood that these preferred embodiments illustrate, but do not limit the procedures which may be used in the production of isocyanate-silico-formate resins and foams. Parts and percentages are by weight unless otherwise indicated.

EXAMPLE I

About 60 parts by weight silico-formic acid and about 90 parts by weight toluene diisocyanate (having an isomer ratio of about 80% 2, 4 and 20% 2, 6) are mixed, then are heated to about 50° C for about 30 minutes. A creamy mixture of silico-formic acid and toluene diisocyanate-silico-formate polymer having a viscosity in the range of 10,000 to 20,000 centipoise results. The mixture is then cooled to room temperature. About 5 parts by weight water is then added and the mixture is heated to about 45° C with agitation. The mixture expands to about 5 times the original volume and becomes rigid and hard in about 30 minutes. The foam softens somewhat at about 75° C, but does not melt even with further increases in temperature. The foam softens but does not completely dissolve in toluene and acetonitrile.

EXAMPLE II

About 2 parts by weight silico-formic acid and about 3 parts by weight toluene-2,4-diisocyanate are mixed, agitated and heated to about 55° C for about 25 minutes, thereby producing a creamy mixture of silico-formic acid and toluene diisocyanate-silico-formate, with a viscosity in the range of about 10,000 to 20,000 centipoise. About 0.2% by weight cobalt naphthenate is added to the mixture and agitated for about 8 minutes until the mixture begins to expand. The chemical reaction is endothermic, with the mixture remaining near room temperature. The mixture expands to about 5 times the original volume and produces a rigid foam in about 25 minutes. The foam softens at about 75° C but does not melt.

EXAMPLE III

About 2 parts by weight silico-formic acid and about 3 parts by weight toluene diisocyanate (having an isomer ratio of about 65% 2, 4 and about 35% 2, 6) are mixed, then agitated for about 25 minutes at about 35° C. A creamy mixture of silico-formic aciid and toluene diisocyanate-silico-formate with a viscosity in the range of 10,000 to 20,000 centipoise results. About 0.05 weight percent cobalt napthanate is added to the mixture and mixed for about 10 minutes, whereupon the mixture expands to about 6 times the original volume and produces a rigid foam in about 25 minutes.

EXAMPLE IV

About 2 parts dry granular silico-formic acid and about 3 parts toluene diisocyanate (with an isomer ratio of about 80% 2, 4 and about 20% 2, 6) are mixed. About 3 weight percent sodium carbonate is added to the mixture, which is agitated for about 30 minutes, producing a creamy mixture of silico-formic acid and toluene diisocyanate-silico-formate. The mixture is heated to about 45° C for about 5 minutes, then the mixture expands to about 4 times its original volume and forms a rigid, hard foam in about 30 minutes.

EXAMPLE V

About 1 part by weight dry granular silico-formic acid and about 3 parts by weight toluene diisocyanate (with an isomer ratio of about 65% 2, 4 and about 35% 2, 6) are mixed, then heated to about 40° C for about 25 minutes, producing a creamy mixture of silico-formic acid and toluene diisocyanate-silico-formate. About 4 weight percent glacial acetic acid is added to the mixture, which is then heated to about 40° C with agitation for about 15 minutes, producing a rigid, hard toluene diisocyanate-silico-formate resin foam about 4 times its original volume.

EXAMPLE VI

Equal parts by weight of dry granular silico-formic acid, castor oil, and toluene diisocyanate (isomer ratio of 80% 2, 4: 20% 2, 6) are mixed together and agitated for about 15 minutes until the mixture forms a creamy appearance. The temperature is kept to about 35° C. About 4% by weight of an activator solution containing 10% sodium dioctyl sulfosuccinate and 10% zinc stearate by weight in water is added to said mixture and then heated to about 110° C. The mixture expands to about 7 times the original volume in about 10 minutes and forms a semi-rigid foam in about one hour. The said foam will cure without external heat in about 8 hours.

EXAMPLE VII

Equal parts by weight of dry granular silico-formic acid and castor oil are mixed, then an alkali catalyst, about 5% by weight of sodium carbonate is added and the mixture agitated while heating to about 90° C for about 25 minutes, thereby producing a light tan mixture of castor oil-silico-formate and silico-formic acid. About the same amount by weight of toluene diisocyanate as the originally added silico-formic acid is added to said mixture and mixed for about 15 minutes until the mixture forms a creamy appearance. About 5% by weight of an activator solution containing 10% ammonium stearate in water is added and mixed well. The mixture expands to about 8 times its original volume and the foam is heated to about 120° C for about 1½ hours, thereby producing a strong rigid foam. The foam will cure without external heat in about 8 hours.

EXAMPLE VIII

About 2 parts of dry granular silico-formic acid and about 3 parts of toluene diisocyanate are mixed and heated to about 45° C while agitating for about 30 minutes, thereby producing a creamy mixture of toluene diisocyanate-silico-formate and silico-formic acid. About one part of castor oil is added to about 2 parts of said mixture and mixed well. About 3 weight percent of an activator solution containing 10% ammonium-stearate in water is added to said mixture. In approximately 5 minutes the mixture expands to about 5 times its original volume and forms a tough rigid foam in about 2 hours.

EXAMPLE IX

Another variation on the diisocyanate-silico-formate type resin and foam is produced by the following steps:

a. About 1 part by weight dry silico-formic acid and about 1 part triethylene glycol are mixed and an alkali catalyst, sodium carbonate, is added until a pH of about 10 is reached. The mixture is heated to about 100° C for about 25 minutes, producing a tan mixture.

b. About 1 part by weight dry granular silico-formic acid and about 3 parts by weight toluene diisocyanate are mixed and heated to about 40° C with agitation for about 30 minutes, producing a creamy mixture of diisocyanate-silico-formate and silico-formic-acid.

c. About equal amounts by weight of the products of steps (a) and (b) are mixed together and agitated for about 5 minutes until the mixture begins to expand. The chemical reaction is exothermic and the temperature rises to about 90° C. The mixture expands to about 5 times its original volume and forms a hard rigid foam after about 90 minutes. The resulting foam is soluble in acetic acid and other organic solvents. The dissolved foam forms a tough coating when applied to a surface and dried.

EXAMPLE X

About 2 parts of dry granular silico-formic acid, about 3 parts of glycerol and about 0.1 part of an alkali catalyst, sodium carbonate, by weight are mixed then heated to about 90° C while agitating for about 30 minutes, thereby producing tan granules of glycerol-silico-formate.

About 2 parts by weight of glycerol-silico-formate; about 2 parts by weight of toluene diisocyanate, about 1 part by weight of silico-formic acid and about 0.1 part by weight of an activator mixture containing 10% sodium dioctyl sulfosuccinate in water are mixed and agitated for about 8 minutes until the mixture begins to expand. The mixture expands to about 4 times its original volume and forms a tough rigid foam in about 90 minutes.

EXAMPLE XI

About 1 part granular silico-formic acid, about 1 part adipic acid, about 0.05 part sodium carbonate and about 2 parts diethylene glycol by weight are mixed then heated to about 100° C while agitating for about 90 minutes until the desired viscosity of 10,000 to 20,000 centipoises is obtained.

About 2 parts by weight of this mixture, about 1 part by weight of toluene diisocyanate and about 0.05 part of an activator mixture containing 10% sodium dioctyl sulfosuccinate in water, are mixed and heated to about 110° C for about 1 hour. The mixture expands to about 7 times its original volume and forms a semi-rigid foam.

EXAMPLE XII

About 3 parts of silico-formic acid, about 2 parts toluene diisocyanate and about 3 parts polyethylene glycol by weight are mixed for about 10 minutes until a creamy mixture is formed; then about 3% by weight of an activator mixture containing 10% sodium sulfosuccinate in water is added to said mixture, mixed well, and heated to about 110° C for about 1 hour producing a soft foam.

EXAMPLE XIII

About 4 parts by weight of silico-formic acid, about 4 parts castor oil by weight and 3 parts by weight of toluene diisocyanate are mixed and agitated for about 30 minutes producing a thick creamy mixture. The mixture is then heated to about 40° C for about 10 minutes. About 4% by weight of an activator mixture containing 10% sodium sulfosuccinate in water is added and mixed well, then heated to about 110° C for 1 hour producing a tough semi-rigid foam which has expanded to about 8 times its original volume.

EXAMPLE XIV

About 3 parts by weight of silico-formic acid, and about 3 parts by weight of triethylene glycol are mixed together then about 3 parts by weight of toluene diisocyanate is slowly added while agitating said mixture to hold the temperature below 70° C. The mixture is then heated to about 110° C for about 1 hour thereby producing a rigid foam which has expanded to about 6 times its original volume. The foam is soluble in acetic acid and other organic solvents.

EXAMPLE XV

Equal parts by weight of silico-formic acid and ethylene glycol are mixed with about 5% sodium carbonate then heated for about 30 minutes thereby producing tan granules. About 1 part by weight of toluene diisocyanate and 2 parts by weight of the tan granules are mixed. The chemical reaction is exothermic and the temperature rises to about 90° C and produces a rigid foam which expands to about 4 times its original volume and is soluble in acetic acid and other organic solvents.

EXAMPLE XVI

About 2 parts by weight of silico-formic acid and about 4 parts by weight naphthalene-1,5 diisocyanate are mixed and heated to about 60° C while agitating for about 55 minutes producing a solid naphthalene-diisocyanate-silico-formate polymer.

EXAMPLE XVII

About 2 parts by weight silico-formic acid and about 4 parts by weight hexamethylene diisocyanate are mixed and heated to about 50° C while agitating for about 50 minutes thereby producing a hexamethylene diisocyanate silico-formate polymer. About 3% by weight of an activator mixture containing 25% dimethyl ethanolamine and 10% ammonium stearate in water is added to the mixture, mixed well, and heated to about 50° C thereby producing a semi-rigid hexamethylene diisocyanate-silico-formate foam which has expanded to approximately 6 times its original volume.

EXAMPLE XVIII

About 2 parts by weight of dry granular silico-formic acid and about 5 parts by weight of tri-(p-isocyanylphenyl)methane are mixed then heated to about 55° C for about 45 minutes while agitating thereby producing tri-(p-isocyanylphenyl)methane-silico-formate polymer. About 5% by weight of an activator mixture containing 25% diethylethanolamine, 20% ammonium oleate, 20% sulphonated castor oil and 30% water is added to said polymers and heated to about 45° C while agitated and became a semi-rigid tri-(p-isocyanylphenyl)methane-silico-formate foam which has expanded to about 6 times its original volume.

EXAMPLE XIX

About 2 parts by weight of dry granular silico-formic acid and about 4 parts by weight of diphenylmethane-4,4'-diisocyanate are mixed, heated to about 55° C while agitating for about 40 minutes thereby producing diphenyl-methane-4,4'-diisocyanate silico-formate polymer. About 8% by weight of an activator mixture containing 45% triethylamine, 20% calcium stearate and 35% water is added to said polymer and heated to about 50° C for about 1 hour thereby producing a semi-rigid diphenylmethane-4,4'-diisocyanate silico-formate foam which has expanded to about 5 times its original volume.

EXAMPLE XX

About 2 parts of dry granules silico-formic acid, about 2 parts of succinic acid and about 0.1 part sodium carbonate by weight are mixed and heated to about 200° C for about 30 minutes thereby producing succinic silico-formic anhydride. About 2 parts dry weight of toluene diisocyanate and 3 parts by weight of succinic silico-formic anhydride are mixed and heated to about 40° C for about 10 minutes. About 5% by weight of an activator mixture containing 10% sodium sulfosuccinate in water is mixed with said mixture and the mixture expands to about 5 times its original volume thereby producing a rigid foam.

EXAMPLE XXI

About 3 parts by weight of a dry granular silico-formic acid, about 3 parts by weight of polypropylene glycol and about 3 parts by weight of toluene diisocyanate are mixed and agitated for about 10 minutes until a creamy mixture is formed then about 3% by weight of an activator mixture containing 10% sodium sulfosuccinate in water is added to said mixture, mixed well, and heated to 110° C for about 1 hour producing a soft to semi-rigid foam.

Although certain specific preferred ingredients and conditions are described in conjunction with the above detailed description of the invention and Examples, these may be varied and other ingredients may be used where suitable, with similar results. For example, various cross-linking or modifying agents may be used, if desired.

Other applications, modifications and ramifications of this invention will occur to those skilled in the art upon reading this disclosure. These are intended to be included within the scope of this invention, as defined in the appended claims.

I claim:

1. A process for the production of isocyanate-silico-formate compositions which comprises the steps of:
   (a) providing about 1 mol of silico-formic acid;
   (b) mixing therewith from about 0.5 to about 2 mols of an organic diisocyanate compound;
   (c) maintaining said mixture at a temperature of from about 20° C to about 60° C; and
   (d) agitating said mixture until a smooth, creamy appearance is obtained.

2. The process according to claim 1, including the further steps of adding a foaming agent to said mixture after step (d) and heating said mixture to a temperature of from about 90° C to about 150° C until said mixture expands in volume at least 4 times, forming a self-sustaining foam.

3. The process according to claim 1 wherein said diisocyanate compound is selected from the group consisting of toluene-2,4-diisocyanate; toluene-2,6-diisocyanate; diphenylmethane-4,4'-diisocyanate; naphthalene-1,5-diisocyanate; hexamethylene diisocyanate and mixtures thereof.

4. The process according to claim 3 wherein said diisocyanate compound is toluene diisocyanate with an isomer ratio of from about 60 to 85 weight percent of the 2, 4 isomer and from about 40 to 15 weight percent of the 2, 6 isomer.

5. The process according to claim 2 wherein said foaming agent is selected from the group consisting of water, sodium dioctyl sulfosuccinate, cobalt naphthenate, zinc stearate, and mixtures thereof, and is added after step (d) of claim 1.

6. The process according to claim 5 wherein said foaming agent comprises about 1–3 weight percent water.

7. The process according to claim 1 wherein a weight of an organic polyhydroxy compound, about equal to the weight of silico-formic acid used, is added to said mixture after step (d) of claim 1.

8. The process according to claim 7 wherein said polyhydroxy compound is selected from the group consisting of castor oil, triethylene glycol, diethylene glycol, glycerol, trimethylol propane, butynediol, polyethylene glycol, polypropylene glycol, monoglycerides of hard fatty acids, butanediol-1,4, polybutylene glycol, pentamethylene glycol, hexamethylene glycol, tripentaerythritol, polyesters containing 2 mols linoleic acid per mol diethylene, ethylene glycol, propylene glycol, Bisphenol-A and mixtures thereof.

9. The process according to claim 1 comprising the additional step of mixing from about 1 to 2 mols of an organic polyhydroxy compound with said organic diisocyanate prior to mixing said diisocyanate compound with said silico-formic acid.

10. The products as produced by the process of claim 1.

11. The product produced in claim 2.

* * * * *